United States Patent [19]

Bouwens et al.

[11] Patent Number: 4,637,598
[45] Date of Patent: Jan. 20, 1987

[54] HOLDER FOR A STACK OF SHEETS

[75] Inventors: Jan M. M. Bouwens, Kessel; Hendrik E. P. Schiffelers, Simpelveld, both of Netherlands

[73] Assignee: Oce-Nederland B.V., Venlo, Netherlands

[21] Appl. No.: 755,197

[22] Filed: Jul. 12, 1985

[30] Foreign Application Priority Data

Jul. 27, 1984 [NL] Netherlands ............. 8402365

[51] Int. Cl.⁴ ............................................. B65H 7/14
[52] U.S. Cl. ................................. 271/3.1; 271/258; 271/265; 271/207
[58] Field of Search ............... 271/3.1, 4, 258, 265, 271/153, 154, 155, 7, 10, 145, 147, 207

[56] References Cited

U.S. PATENT DOCUMENTS

| | | | |
|---|---|---|---|
| T103,301 | 8/1983 | Smith, Jr. ............. | 271/3.1 |
| T957,006 | 4/1977 | Reid et al. ............. | 271/3.1 |
| 4,164,347 | 8/1979 | McGrain ............. | 271/3.1 |
| 4,269,406 | 5/1981 | Hamlin ............. | 271/3.1 X |
| 4,480,824 | 11/1984 | Acquaviva ............. | 271/3.1 |
| 4,544,148 | 10/1985 | Kitajima et al. ............. | 271/3.1 |

Primary Examiner—Duane A. Reger
Assistant Examiner—Lawrence J. Goffney, Jr.
Attorney, Agent, or Firm—Reed Smith Shaw & McClay

[57] ABSTRACT

A holder for a stack of sheets which can be fed therefrom in successive cycles from the bottom of the stack and returned to the top of the stack or, in the last cycle, discharged to a tray. The holder includes a separator which can be engaged between the sheets of the stack for separating returned sheets from the other sheets of the stack. A detection system is provided for detecting sheets that have been placed in the holder (for starting a first cycle) and for detecting when all of the sheets have been returned to the holder (for starting a next cycle). The detection system includes a light source and a light sensitive detector installed at the bottom of the stack. When, by the feeding of sheets, the separator reaches the bottom of the stack, the separator intercepts the light from the light source to cause a signal from the detector. This signal is similar to the signal of the detector when the holder is empty, but which signal differs from the reaction of the detector when a sheet intercepts the light.

8 Claims, 10 Drawing Figures

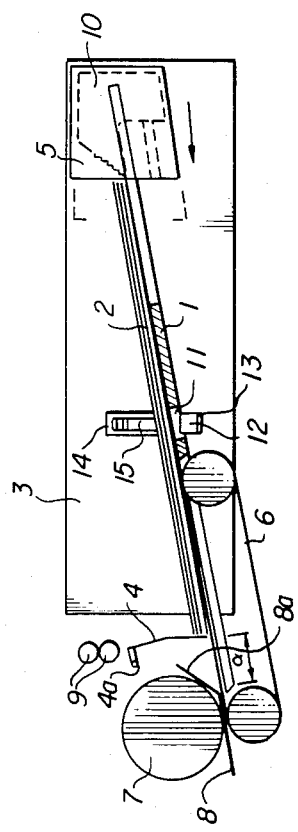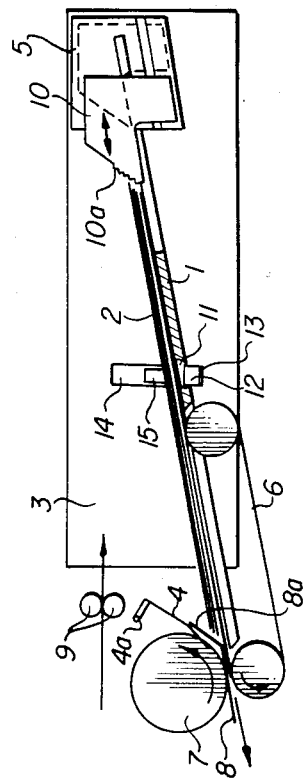

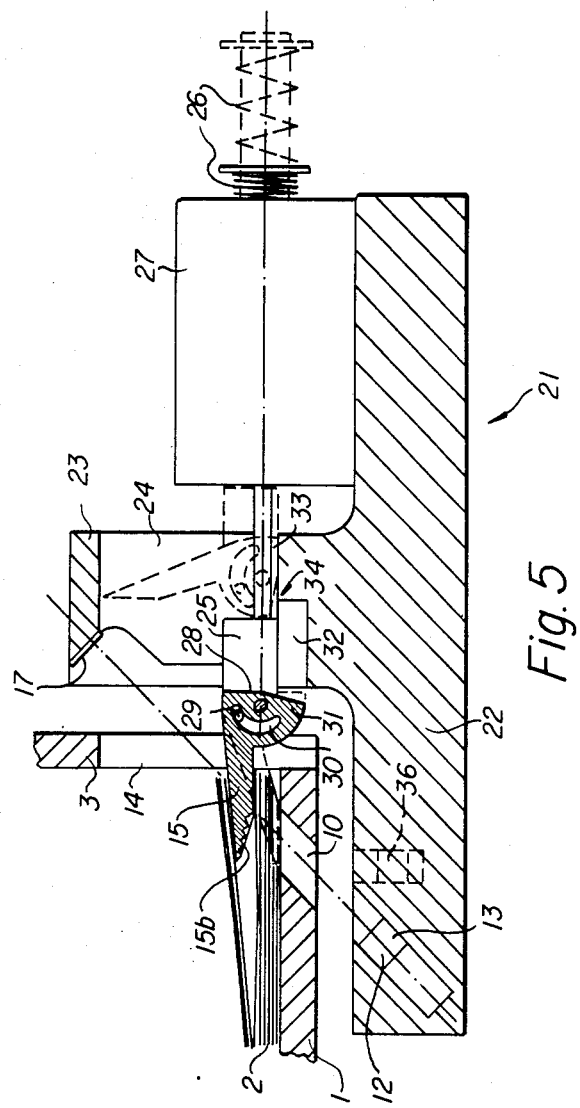

HOLDER FOR A STACK OF SHEETS

FIELD OF THE INVENTION

The present invention relates to a holder for a stack of sheets, and, in particular, to a holder with means for detecting the presence or absence of sheets within it which includes a separating means movable between an inoperative position wherein it is not in contact with the stack and an operative position wherein it is contact with the stack and the operation of which is activated by said detecting means.

BACKGROUND OF THE INVENTION

Holders for stacks and sheets are well known and used in many different environments. One particular use is in electrophotographic devices to store the paper onto which the copied image is formed. For example, European Application No. 0 102 202 A3 published on Mar. 7, 1984 describes a holder for a stack of sheets with a separating means for separating the sheets that are returned to the holder from those which have yet to leave the holder to be copied. That application describes numerous document feeding devices and paper aligners which utilize stack holders.

Holders of the type which include a separator are described in United Kingdom Pat. No. 1,599,774 which shows a holder in which sheets fed from the holder are returned to it after being processed. The separating means separates the returned sheets from those sheets which are still to be fed from the holder, and being placed back on the stack of sheets for this purpose whenever a detector reacts. In that holder, however, the presence or absence of sheets therein cannot be detected.

Such detecting means are very desirable so that it can be determined when sheet processing can start and, if the sheets are not to be returned to the holder after processing when all of the sheets have been processed. It is, therefore, an object of this invention to provide simple means with which the presence or absence of sheets in the holder can be detected.

SUMMARY OF THE INVENTION

According to the invention, this objective is attained in that a detector is positioned to react when there are no sheets present in the holder and the separating means is in the inoperative position. It is, therefore, possible to successively determine whether sheets have been placed in the holder, whether a predetermined number of sheets has been taken from the holder for processing and whether all the sheets have been fed from the holder.

Preferably, if the sheets to be processed reflect little light, the separating means and a fixed part of the holder are each provided with a light-reflecting surface, which surfaces reflect light from the light source in the direction of the detector, respectively, when the separating means is in the operative position and in the absence of sheets between the separating means and the detector, and when the separating means is in the inoperative position and in the absence of sheets in the holder. Preferably, the light-reflecting surface of the fixed part of the holder lies in a cavity in the holder wall against which a side edge of the stack can be placed, so that a stack of sheets can be placed in the holder without obstructing the light-reflecting surface. It is desirable that the light source and the detector be positioned close together so that the angle of view of the detector is small and, hence, relatively insensitive to stray light.

If transparent sheets are to be processed, the separating means is provided with a surface which, in the operative position of the separating means and in the absence of sheets between the separating means and the detector, prevents light emitted by the light source from being reflected in the direction of the detector.

In a preferred embodiment of the invention, the holder is provided in a sheet processing machine provided with a separating means, a return means which can return sheets to the holder after processing and a discharge means which can discharge sheets from the machine after processing. Control means are provided for the sheet processing machine and are connected to an adjustable counter, such that when the counter has been set to a counting value of one, the control means actuates the feed means and the discharge means and, when the counter has been set to a counting value higher than one, it successively:

A. actuates the feed means and the return means in response to the cessation of the detector signal (because sheets have been placed in the holder);

B. actuates the separating means in response to the staying away of a signal of the detector at the moment that a number of sheets have been fed from the holder, which number corresponds to the maximum number of sheets that can be on the way out of reach of the detector;

C. in case of actuated separating means, repeats the following cycle in response to a next signal of the detector;

deactuation and reactuation of the separating means so that it again comes into contact with the other end of the stack and the resetting of the counter by a value of one until the counter is on a value of one;

D. deactuates the separating means and the return means and actuates the discharge means in response to a subsequent signal of the detector; and E. deactuates the feed means and the discharge means in response to a subsequent signal of the detector.

The effect of this is that when the number of sheets placed in the holder is larger than the maximum number of sheets, the separating means is no longer actuated when the sheets are fed from the holder for the last time. Further, when the number of sheets placed in the holder is less than the maximum number of sheets, the separating means is entirely inactive.

Other features and advantages of the invention will be explained in detail in the following description with reference to the accompanying drawings.

BRIEF DESCRIPTION OF THE DRAWINGS

FIG. 1 is a cross-section of a holder according to the invention with a separating means in the inoperative position.

FIG. 2 is a cross-section of a holder according to the invention with a separating means in the operative position.

FIG. 5 is a cross-section of an embodiment of the detection system according to FIGS. 4A, 4B and 4C.

PRESENTLY PREFERRED EMBODIMENT

Figure 3C:
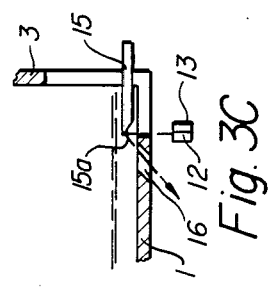
FIGS. 3A, 3B and 3C are diagrams of a detection system in a holder according to the invention.

Referring to FIG. 1 the holder of the present invention comprises a sloping table 1 to support a stack of sheets 2 and a wall 3 against which a side edge of the stack can be placed. Frames 4 and 5 extend in a direction perpendicular to wall 3 and serve as abutments for the front and rear edges, respectively, of stack 2. Positioned beneath table 1 is endless conveyor belt 6 which is adapted to come into contact, via an opening in table 1, with the bottom of a stack of sheets placed on the table 1. Endless belt 6 cooperates with backing roller 7 and pressing shoe 8 for discharging sheets one by one from the bottom of the stack from the holder. (E.g., in a manner as explained in Dutch Patent Application No. 8101927.) The discharged sheets can be fed to a sheet processing device (not shown), e.g., the exposure station of a copying machine.

After processing, a sheet can be returned to the holder by means of rollers 9 and deposited on the stack. Frame 4 is secured to rotate about pivot 4a and can be placed by drive means (not shown) in a position represented in FIG. 1, in which the frame is substantially perpendicular to the plane of the table 1 and with its free end substantially in contact with the belt 6, and in a position represented in FIG. 2 in which the frame includes an acute angle with the plane of the table 1. Pressing shoe 8 is provided with an abutment surface 8a which has an acute angle with the plane of the table and against which the inserted stack can be pushed. Frame 5 is secured to table 1 and is manually slidable in the direction of frame 4 to adjust the position to the size of the inserted stack of sheets. Frame 5 can be secured in that position. A shoe 10 is secured to frame 5 and, by drive means (not shown), can be reciprocated with respect to frame 5 between a position in which shoe 10, as considered in the direction of frame 4, does not project beyond frame 5, and a position in which shoe 10 projects in that direction past the frame 5 over a distance substantially equal to the distance a between the free end of frame 4 and pressing shoe 8. The surface 10a of shoe 10, which can come into contact with the stack of sheets in the holder, extends substantially parallel to abutment surface 8a of shoe 8.

An opening 11 is also formed in table 1 and positioned beneath it is a light source 12. Light source 12 projects a beam of light freely upwardly in the direction of stack 2 placed in the holder. Also disposed beneath opening 11 is a detector 13 which is sensitive to light emitted by light source 12. Detector 13 is disposed close to light source 12, but outside the beam of light directly emitted by the light source. An opening 14 is formed in wall 3 behind which is disposed separating means 15.

Separating means 15 is movable between the position represented in FIG. 1, in which it does not project beyond wall 3, and a position represented in FIG. 2, in which it is in contact with a stack of sheets present in the holder. In this latter position, that part of separating means 15 which is in contact with the stack is freely movable in the vertical direction. A preferred embodiment of separating means 15 will be described hereinafter with reference to FIG. 5.

In the starting position represented in FIG. 1, a stack of sheets 2 can be placed on table 1 against wall 3 and frame 4. Abutment frame 5 in then pushed against the rear edge of the stack and secured in that position. Before conveyor belt 6 is started, frame 4 is turned into the position represented in FIG. 2 and simultaneously with the slow movement of belt 6 shoe 10 is pushed forward so that the stack 2 is pressed into a skew shape in which the front edge of the stack comes into contact with abutment surface 8a of shoe 8. Any stack which has been formed on the skew and/or inserted on the skew is straightened by this action. During the subsequent discharge of sheets one by one from the holder by means of belt 6 which is now moving more quickly, shoe 10 can periodically be reciprocated in order to keep the stack pressed against abutment 8a. If sheets are deposited automatically into the holder after processing, shoe 10 is pulled back each time before a sheet is deposited and then pushed back against the stack in order to push the deposited sheet against the abutment 8a.

Figure 3B:
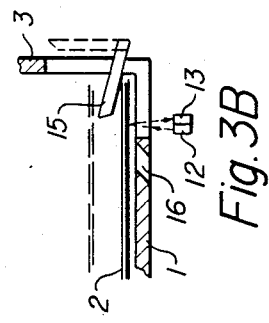
Figure 3A:
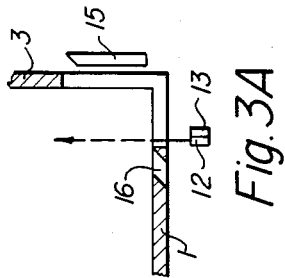

An embodiment of the detection system is represented in FIGS. 3A, 3B and 3C. It is based on the detection of light reflected from the sheet surface. FIG. 3A represents the situation in which there are no sheets in the holder and the separating means is not actuated, i.e., it is in a position in which the detection means is not projecting outside wall 3. In this situation the light emitted by light source 12 cannot reach detector 13, so that the detector delivers a signal representative of this situation. It will be apparent that detector 13 must be prevented from responding to light originating from other light sources in the surroundings; e.g., by making the working range of the detection system lie in the IR range.

FIG. 3B represents the situation after a stack of sheets has been placed in the holder and separating means 15 has been actuated. In this situation the light emitted by light source 12 is reflected from the surface of the bottom sheet of the stack and directed towards detector 13. This results in the detector delivering a signal representative of this situation. This signal can be used to effect discharge of sheets from the holder. If the sheets are returned to the holder after processing, actuation of the separating means can be derived from the movement of the first sheet fed from the holder.

The situation represented in FIG. 3B is maintained when the bottom sheet is successively fed from the holder, since the next sheet provides said reflection.

FIG. 3C represents the situation when all of the sheets are removed from the area between separating means 15 and the table 1. The light emitted by light source 12 is now reflected at the surface 15a of the separating means 15 and directed towards a zone 16 outside the field of view of detector 13. Consequently, detector 13 receives no more light and delivers a signal corresponding to the signal delivered by the detector in the situation in which there are no sheets in the holder, but this is now used to cause the separating means 15 to be withdrawn, e.g., in a manner which will be explained hereinafter with reference to FIG. 5.

If sheets are still present in the holder after withdrawal of separating means 15 (e.g., sheets which have been returned to the holder after processing), separating means 15 can be reactuated. Thus, the situation represented in FIG. 3B is again obtained, in which the discharge of sheets from the holder can continue. If there are no more sheets present in the holder after withdrawal of separating means 15, then the initial situation represented in FIG. 3A is resumed.

It is apparent that in order to prevent the light originating from light source 12 from falling upon detector 13, separating means 15 may be provided with a surface 15a which is light-absorbing instead of light-reflecting. The above-described detector system is particularly suitable when sheets are processed which have a surface reflecting a relatively considerable amount of light, e.g., white sheets and other light-colored sheets, as well as transparent sheets.

Figure 4C:
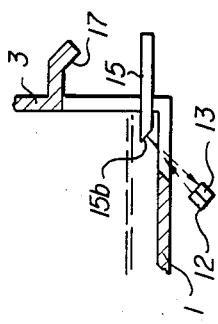
FIGS. 4A, 4B and 4C are diagrams of another detection system in a holder according to the invention.
Figure 4B:
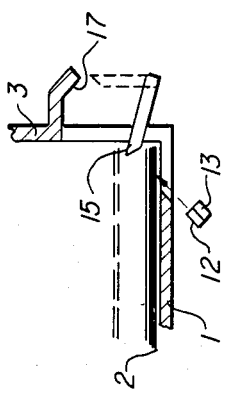
Figure 4A:
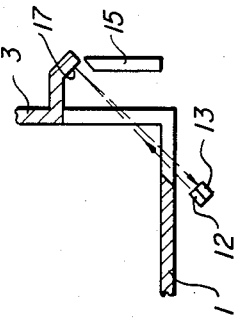

The embodiment of the detection system represented in FIGS. 4A, 4B and 4C is based on the detection of the interruption of a beam of light by a sheet or a stack of sheets. In the embodiment, a light-reflecting surface 17 is disposed in a cavity in wall 3 which can reflect light emitted by light source 12 back to detector 13. This is the case represented in FIG. 4A, in which there are no sheets in the holder and separating means 15 is not actuated. FIG. 4B represents the situation in which the sheets have been placed in the holder and separating means 15 is actuated. Because of the inclined position of the light source and detector relative to the stack, very little light originating from light source 12 can reach the detector 13 in this situation, so that on analogy with the embodiment described hereinbefore, the detector delivers a signal representative of this situation.

FIG. 4C represents the situation similar to the situation described with reference to FIG. 3C.

Light emitted by light source 12, however, is now reflected onto detector 13 by surface 15b of separating means 15, which surface is substantially parallel to surface 17, so as to deliver a signal representative of this situation. This detection system is particularly suitable when sheets are processed which have a surface reflecting relatively little light, e.g., black and other dark-colored sheets.

Another embodiment of the detection system will now be described with reference to FIG. 5, the operation of which is based on the principle described in reference to FIG. 4. The solid lines in FIG. 5 represent the situation in which a stack of sheets 2 has been placed on table 1 and bears against wall 3. Table 1 is formed with an opening 10 and wall 3 with an opening 14. The holder contains a frame 21 of which a part 22 extends beneath opening 10 and an upright part 23 extends adjacent opening 14. Light source 12 and light-sensitive detector 13 are secured to part 22, and close together as considered in the direction perpendicular to the drawing plane. A light-reflecting mirror 17 is secured to the upright part 23. Light source 12, detector 13, mirror 17 and openings 10 and 14 are so positioned relatively to one another that light originating from light source 12 can shine onto detector 13 via mirror 17. A horizontal hole 24 is formed in the upright part 23 and in it a sliding block 25 can reciprocate in a direction perpendicular to wall 3 (between a broken line initial position and an actuated position indicated in solid lines). Spring 26 holds sliding block 25 in the initial position and solenoid 27, when energized presses the sliding block into the operative position against the bias of spring 26. Pin 28 is secured to sliding block 25 and separating means 15 is secured thereon so as to be freely rotatable. Pin 29 is also secured to sliding block 25 and drops into a slot 30 formed in separating means 15. The ends of the slot 30 limit the zone in which the separating means can rotate. That part of the separating means which can engage between the sheets is relatively thin and is provided, at the bottom, with a number of mirror parts 15b which are formed stepwise on the separating means and which, in the lowest possible position of the separating means, are parallel to mirror 17. Separating means 15 is also provided with cam 31 which fits with clearance in a noncontinuous slot 32 formed in the wall of the hole 24.

The embodiment represented in FIG. 5 operates as follows: In the starting position indicated in broken lines, sliding block 25 is held in the starting position by spring 26. Separating means 15 occupies an angular position relatively to sliding block 25 in which the center of gravity of the separating means lies on that side of the pivot of the means (pin 28) which is remote from wall 3 and the means bears by an edge 33 on the wall of hole 24. On energization of solenoid 27 the latter presses the sliding block into the solid-line position. During this movement, the separating means retains the original angular position until, at the end of the movement, separating 15 tips, as a result of the kinetic energy, and drops through opening 14 onto a stack of sheets 2 placed in the holder. The drop height of the separating means 15 is limited by pin 29. This pin intercepts the separating means when the same is at a short distance from the table 1. Thus, the last sheet can also be fed from the holder without being clamped between the separating means and the table. When there are no longer any sheets present beneath separating means 15, light source 12 can project a beam of light onto detector 13 via the reflecting surface 15b at the bottom of the separating means, so that energization of solenoid 27 is interrupted and spring 26 pulls the sliding block 25 back to the starting position.

During this return movement, separating means 25 moves parallel to the plane of table 1 until it is outside of its range. Simultaneously cam 31 moves freely through slot 32. On continuing return movement, cam 31 encounters edge 34 of hole 24 so that the separating means 15 pivots about pin 28 and is pressed into the broken-line starting position.

A comparison of the detector principles illustrated in FIGS. 3 and 4, respectively, will clearly show that the embodiment described hereinbefore for the detection systm can readily be adapted to the detection principle according to FIG. 3. All that is required for this purpose is to place light source 12 and detector 13 in the position indicated by broken line 36 in FIG. 5. Also, the reflecting bottom of separating means 15 need not be stepped. This bottom can also be light-absorbing, in which case the angle formed by the bottom of the separating means with the table 1 is zero. Of course, mirror 17 is then unnecessary.

The operation of a copying machine using a holder according to the invention will now be explained with reference to FIG. 6.

Figure 6:
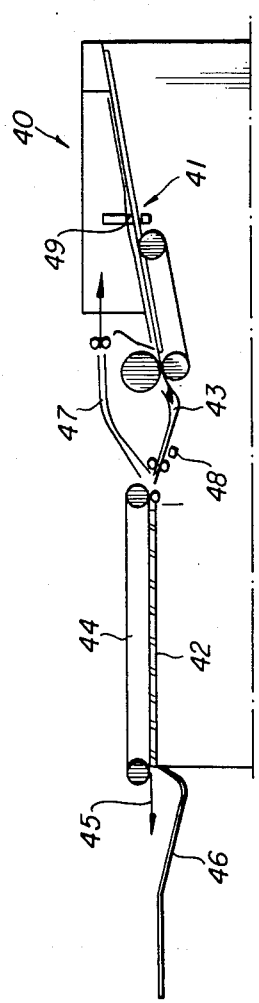
FIG. 6 is a diagram illustrating part of a copying machine in which a holder according to the invention is used.

The copying machine represented in part in FIG. 6 comprises a holder 40 which can be constructed like the holder represented in FIGS. 1 and 2. Holder 40 is provided with a detection system 41 which may be constructed like the detection system represented in FIG. 3 or like a detection system represented in FIG. 4. The copying machine also comprises an exposure window 42 on which an original for copying can be positioned either manually or by means of a conveyor belt 44 an original supplied from holder 40 via path 43. In the latter case, belt 44 discharges a copied original subsequently away from the window, either via a path 45 to tray 46 or via path 47 to holder 40. Feed path 43 is provided with a detector 48 which can detect whether an original has been fed from the holder, i.e., it is outside the range of detection system 41. The copying machine is also provided with a control system (of which detectors 41 and 48 and a counter adjustable to the number of copies to be made form a part). This system enables the machine to operate in specific manners described hereinafter, one of the reasons for this being the position of said detectors.

When the copying machine is started, the detection system 41 first detects whether there are originals present in the holder. If the originals are placed manually on the exposure window 42, they can be copied for a set number of times. After the copying machine has been started, if the detection system 41 detects that there are originals present in holder 40, the bottommost original is fed from holder 40 via path 43 to exposure window 42 and positioned thereon by means of belt 44. When detector 48 responds to the original, if detection system 41 detects that there is no further original present in holder 40, the original fed to the window is copied the set number of times and then discharged via path 45 to tray 46. If, however, detection system 41 detects that there is at least one original present in holder 40 when detector 48 responds to a passing original then:

if the counter has been set to make one copy of each of the inserted originals, the original fed to window 42 is imaged once and then discharged directly to tray 46; the copying machine is then again set in the starting position;

if the counter has been set to make more than one copy of each of the inserted originals, the original fed to the window 42 is imaged once and then returned directly via path 47 to the holder 40.

When detector 48 responds to the subsequent original, if the detection system 41 detects that at least a third original is still in holder 40, separating means 49 is placed on the first returned original. The cycle of feeding an original from the holder, imaging said original once, and returning said original to the holder is repeated until detection system 41 detects that there is no original remaining under the separating means. In response to this latter detection, the control system causes the separating means to be withdrawn and the counter to be reset by a value of one. The cycle in progress is then terminated.

When detector 48 responds to the subsequent original, if the detection system 41 detects, that there is no original whatever in the holder 40, the separating means 49 remains inactive and the cycle of feeding an original from the holder, imaging said original once and returning said original to the holder is repeated until both originals have been copied the set number of times.

The copying machine is then again in the position that it occupied on starting. Whenever the copying machine comes back to this starting position, the course of events described hereinbefore takes place, starting with detecting whether there are originals in the holder.

In addition to the normal method described hereinbefore, the copying machine can be set to a method in which originals fed from the holder are not returned to the holder, but rather each original fed onto the window is imaged the set number of times and is then discharged into tray 46 via path 45.

While presently preferred embodiments of the invention have been shown and described in particularity, the invention may be otherwise embodied within the scope of the appended claims.

What is claimed is:

1. A holder for a stack of sheets in a sheet processing machine, wherein the sheets to be processed are fed from one end of the stack out of the holder, said holder comprising:

(a) at least a separating means movable between an inoperative position in which it is not in contact with a stack in the holder and an operative position in which it can engage between sheets of the stack; and (b) a light source and a light-sensitive detector positioned below said stack, wherein said separating means and a fixed part of the holder are each provided with a light-reflecting surface for reflecting light from said light source in the direction of the detector when the separating means is in the operative position and in the absence of sheets between the separating means and the detector, and when the separating means is in the inoperative position and in the absence of sheets in the holder.

2. A holder according to claim 1, wherein said holder includes a wall and said light-reflecting surface of the fixed part of said holder lies in a cavity in said holder wall and against which a side edge of the stack can be placed.

3. A holder according to claim 1 or 2, wherein the light source and the detector are positioned close together.

4. A holder for a stack of sheets in a sheet processing machine wherein the sheets to be processed are fed from one end of the stack out of the holder, said holder comprising:

(a) at least a separating means movable between an inoperative position in which it is not in contact with a stack in the holder and an operative position in which it can engage between sheets of the stack; and (b) a light source and a light-sensitive detector positioned below said stack, wherein said separating means is provided with a surface which in the operative position of the separating means and in the absence of sheets between the separating means and the detector prevents light emitted by the light source from being reflected in the direction of the detector.

5. A holder according to claim 4, wherein said surface of said separating means is light-reflecting and when the separating means is in the operative position and in the absence of sheets between the separating means and the detector reflects the light emitted by the light source in a direction other than the direction of said detector.

6. A holder according to claims 1, or 4 for use in a sheet processing machine, wherein said holder includes a separating means, return means for returning sheets to said holder after processing, a discharge means for discharging sheets from said processing machine after processing and control means for said sheet processing machine connected to an adjustable counter, wherein said control means, when the counter has been set to a counting value of one, actuates a feed means and said discharge means and, when the counter has been set to a counting value higher than one, successively:

a. actuates said feed means and said return means in response to the cessation of the detector signal;

b. actuates said separating means in response to the staying away of a signal from the detector when the number of sheets that have been fed from said holder corresponds to the maximum number of sheets that can be on the way out of reach of said detector; and c. when said separating means is actuated, repeating in response to a next signal from the detector, the cycle of:

deactuation and reactuation of the separating means so that said means comes into contact with the other end of the stack and resetting of the counter by a value of one, until the counter is on a value of one;
  a. deactuates the separating means and the return means and actuates the discharge means in response to a subsequent signal from the detector; and
  b. deactuates the feed means and the discharge means in response to a subsequent signal of the detector.

7. A holder according claims 1, or 4, wherein said sheets can be discharged from the bottom of a stack resting on a base of said holder, and said holder includes a sliding block movable between a first position situated close to the holder and a second position situated further away from the holder, said separating means being rotatably secured to said sliding block and freely rotatable between a first angular position in which the center of gravity of the separating means is situated on that side of the pivot point which faces the holder, and a second angular position in which the center of gravity is on the side of the pivot point which is remote from said holder, and above the pivot point, said separating means being adapted to pivot at the end of the movement of said sliding block from said second position to said first position, as a result of the kinetic energy received, from the second angular position to the first angular position; and a cam rigidly connected to said holder and pressing said separating means from the first angular position into the second angular position towards the end of the movement of the sliding block from said first position to said second position.

8. A holder according to claim 7, wherein said sliding block is provided with a cam which, in the absence of sheets between said separating means and said detector, prevents the separating means from coming into contact with the base of the holder.

* * * * *